May 19, 1959
D. J. BLOOMBERG
2,887,128
MIXING AND CONTROL VALVE
Filed Aug. 30, 1955
2 Sheets-Sheet 1
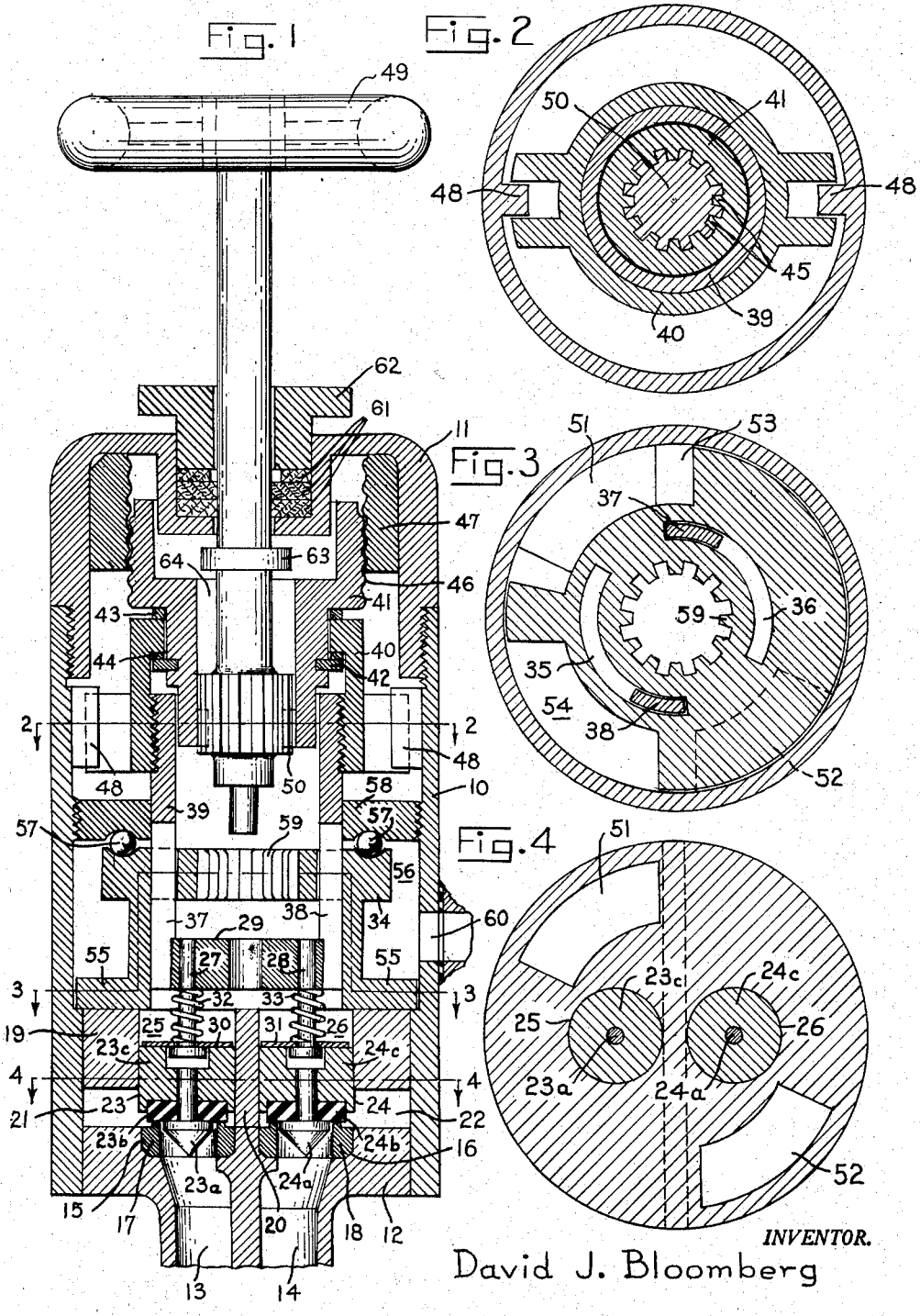
INVENTOR.
David J. Bloomberg

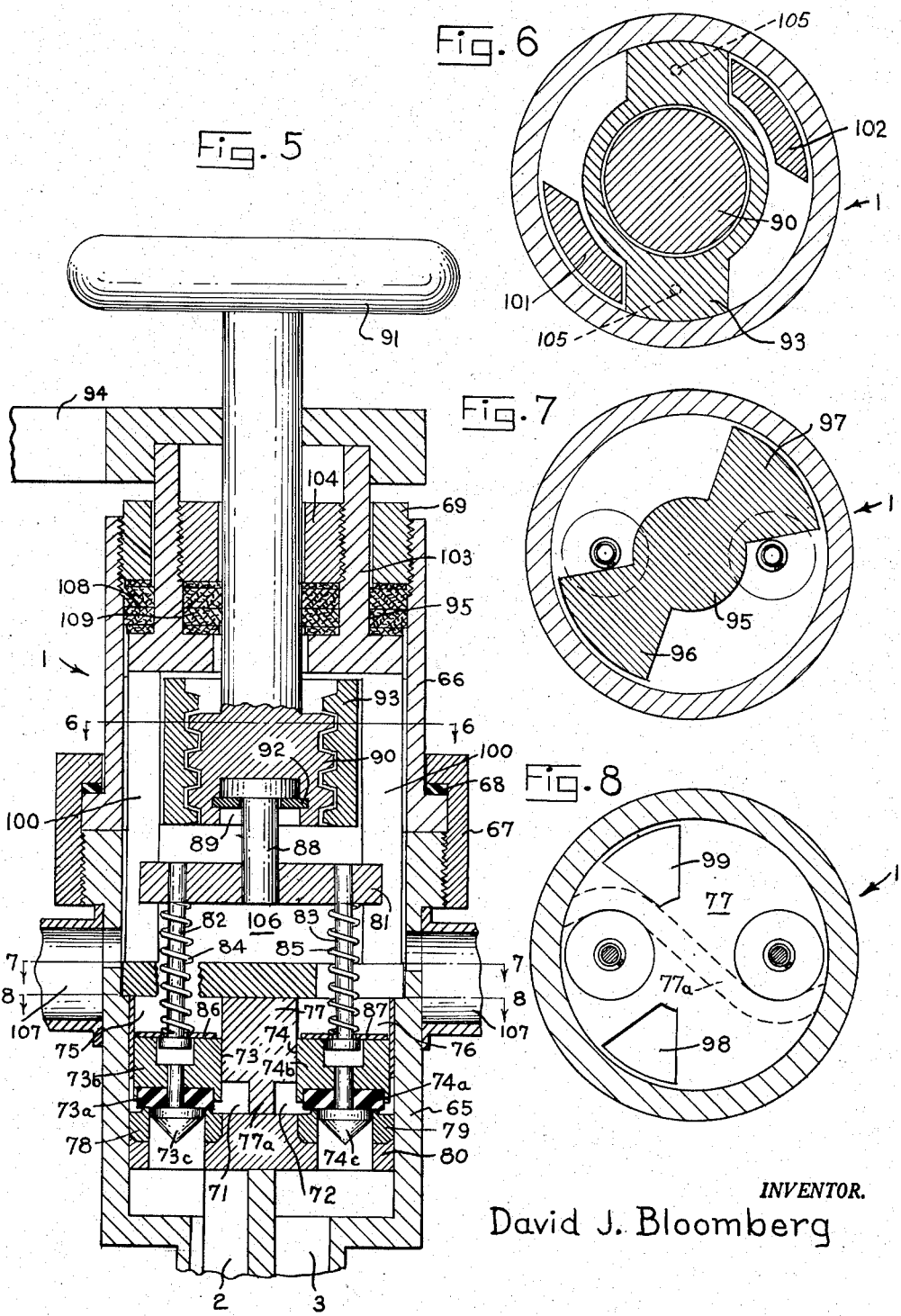

2,887,128
MIXING AND CONTROL VALVE

David J. Bloomberg, Newton, Mass.

Application August 30, 1955, Serial No. 531,546

4 Claims. (Cl. 137—635)

My invention relates to valves, more particularly to mixing and control valves of the type wherein means are provided for controlling the flow of fluids, such as hot and cold water, and for mixing or proportioning the relative flows thereof.

It is one of the objects of my invention to provide an improved mixing and control valve having means for controlling the magnitude of flow of one or more fluids as well as independently operable means for proportioning the relative flows of said fluids.

It is another object of my invention to provide an improved valve of the aforementioned type which is relatively simple in construction and inexpensive to manufacture.

It is a further object of my invention to provide an improved fluid control valve having improved sealing means therein for closing off the fluid inlets, which improved sealing means include means for reducing the wear thereof and for compensating for the wear that does occur over the normal life thereof.

It is still another object of my invention to provide an improved mixing and control valve which is relatively simple to repair and maintain.

Briefly stated, my invention contemplates, in accordance with one aspect thereof, the provision of a valve having separate and independently operable means for mixing and for controlling the flow of two fluids, such as hot and cold water, the mixing control being arranged such that changes in the ratio of flow of the two fluids do not influence the flow control means for controlling the total flow of the two fluids, and vice versa. Independently spring loaded valve means are provided for closing off the fluid inlets, the spring loading means being arranged so as to compensate for variations in dimensions in the inlet valves and to provide for reduced wear in the valve sealing portions, as will hereinafter be explained. The organization and arrangement of the valve is such as to permit the application of low cost, mass production manufacturing techniques and to allow ease of repair and maintenance.

Other objects and advantages of my invention will be apparent from the following description taken in connection with the accompanying drawings, and its scope will be pointed out in the appended claims.

Referring to the drawings, Fig. 1 is an elevational view in cross section of a mixing and control valve embodying my invention; Fig. 2 is a plan cross sectional view of the valve of Fig. 1 taken along the line 2—2; Fig. 3 is another cross sectional view thereof taken along the line 3—3; Fig. 4 is a third cross sectional view of the valve of Fig. 1 taken along the line 4—4; Fig. 5 is an elevational, cross sectional view of a mixing and control valve illustrating another embodiment of my invention; while Figs. 6, 7, and 8 are cross sectional views of the valve of Fig. 5 taken along the lines 6—6, 7—7, and 8—8 respectively.

Referring now in particular to Figs. 1 through 4 of the drawings, the valve illustrated comprises an outer cylindrically shaped, metallic casing or body 10 including a pair of end pieces 11 and 12, the end piece 11 being preferably removably threaded therein as shown and the end piece 12 being preferably brazed or otherwise integrally attached thereto. Two fluid inlet passages 13 and 14 are provided in the end piece 12 and are connectible to separate fluid sources, such as hot and cold water taps.

Two cylindrical bored holes 15 and 16 are also provided in the end piece 12 into which a pair of annular valve seats 17 and 18, formed of a soft metal or other suitable material, are inserted in such a manner as to communicate with the fluid inlet passages 13 and 14. A circular metallic plate 19, having a wall portion 20 thereon, is brazed or otherwise suitably attached to the casing 10 such that the wall portion 20 is brought into contact with the end piece 12 to form a pair of fluid chambers 21 and 22 communicable with the fluid passages 13 and 14 respectively.

The inlet passages 13 and 14 may be closed off from the chambers 21 and 22 by means of a pair of valves 23 and 24 operable through the agency of a suitable manual actuating device, such as a rotatable handle 49, in a manner hereinafter set forth in detail. The valves 23 and 24 include a pair of plugs 23a and 24a as well as sealing members 23b and 24b and cylindrical guides 23c and 24c. The sealing members 23b and 24b are preferably formed of a resilient material, such as rubber, or some other suitable material capable of deformation upon being pressed into engagement with the valve seats 17 and 18. The guides 23c and 24c are positioned so as to be movable within a pair of cylindrical bored holes 25 and 26 in the plate 19, which holes are visible in the plan view of Fig. 4.

A pair of flanged posts 27 and 28 are attached to an externally threaded, cylindrical plate 29 and extend into recesses provided in the valve guides 23c and 24c, the flanged heads on which posts are overlapped by washers 30 and 31 as shown, the washers being attached to the guides 23c and 24c by means of screws or rivets or in any other suitable fashion. The valves 23 and 24 are individually resiliently mounted with respect to the cylindrical plate 29 by reason of the provision of a pair of coil springs 32 and 33, which are mounted on the flanged posts 27 and 28. The springs are pre-compressed a certain amount in the assembly, that is in the position shown in Fig. 1, for reasons hereinafter set forth.

Positioned adjacent the plate 19 is a flow ratio controller 34, in which there is provided a pair of annularly shaped slots 35 and 36, visible in the view of Fig. 3. The operation of the controller 34 will be set forth in detail subsequently. Extending through the slots 35 and 36 are two fingers 37 and 38 which form a part of and extend from a cylindrical flow actuator 39. The fingers 37 and 38 are internally threaded so as to be capable of attachment to the externally threaded plate 29.

The actuator 39 is in turn threaded on to a cylindrical member 40 which is secured to an internally serrated element 41 by means of a snap washer 42. The element 40 is secured between a pair of washers 43 and 44 so as to allow the element 41 to be rotated relative to the element 40. The element 41 is provided with a series of internal serrations 45 and is externally threaded at 46 to mate with an internally threaded element 47 secured within the end piece 11 by being pressed into place or by brazing or other suitable means.

Thus, it will be observed that an assembly longitudinally movable relative to the valve body is formed, the assembly comprising the elements 29, 39, 40 and 41 and being caused to move longitudinally to simultaneously actuate the valves 23 and 24 by rotation of the element 41 within the threaded member 47. It will be apparent from the drawing that only the element 41 of the foregoing assembly is rotatable, the remaining elements being restrained from rotative movement by the provision of guides 48 extending from the casing 10, as will be seen in the plan cross section of Fig. 2. The element 41 may be manually rotated by means of the handle 49, which has thereon a serrated portion 50 capable of engaging the serrations 45 on the element 41.

Thus, the valves 23 and 24 may be actuated to admit fluid from the inlet passages 13 and 14 to the fluid chambers 21 and 22 by rotative movement of the handle 49, such rotative movement causing longitudinal displacement of the element 41 within the threaded member 47, resulting in accompanying displacement of the associated elements 39 and 29 to actuate the valves through the agency of the flanged posts 27 and 28 bearing against the washers 30 and 31 to retract the valves from the closed position, the plate 29 bearing against the springs 32 and 33 to force the valves into the closed position.

It will be observed by reference to Figs. 1 and 4 that the plate 19 is provided with a pair of openings in the form of slots 51 and 52, which are arcuately shaped and which extend through the plate 19 so as to communicate with the fluid chambers 21 and 22, the position of the dividing wall with respect thereto being indicated by the dotted lines in Fig. 4. Referring now to Figs. 1 and 3, it will be seen that the flow ratio controller 34 is provided with a pair of openings 53 and 54 extending through a flange portion 55 thereof, the openings 53 and 54 being of angular extent such as to permit cooperation thereof with the slots 51 and 52 in the plate 19 to control admission of fluid from the chambers 21 and 22 into a mixing chamber 56.

The flow ratio controller 34 is rotatably mounted on a series of ball bearings 57 which bear against an annular bearing plate 58. A series of inwardly extending serrations 59 are provided in the controller 34 and are positioned with the central axis thereof coincident with the axis of the handle 49 so as to be capable of being engaged by the serrations 50 on the handle. Thus, it will be seen that the handle 49 may be moved longitudinally to disengage the serrations 50 thereon from the serrations within the element 41 and bring them into engagement with the serrations 59 on the controller 34 to permit rotation of the controller through the agency of the handle.

As has been pointed out above, the relative flows of fluids from the chambers 21 and 22 into the mixing chamber 56 is controlled by the angular position of the openings 53 and 54 in the controller 34 relative to the slots 51 and 52 in the plate 19. The angular extent of the arcuate openings 51, 52, 53 and 54 and their placement relative to each other is preferably such that the total area of communication between the chambers 21 and 22 and the mixing chamber 56 is substantially constant and equal to the area of either one of the openings 51 and 52 regardless of the angular position of the controller 34.

In the embodiment illustrated in Figs. 1 through 4, the slots 51 and 52 are diametrically opposite from each other and each extends over an angle of about 67°, while the openings 53 and 54 each extend over an angle of approximately 67° and are positioned such that their radial center lines are displaced by an angle of about 113°.

One or more suitable ports or openings 60 may be provided in the casing 10 and may be connected to a faucet or other type of discharge device to allow withdrawal of the mixed fluid from the mixing chamber 56 upon the opening of the valves 23 and 24.

Thus, it will be observed that the flow of the fluids from the inlet passages 13 and 14 through the discharge port 60 may be controlled independently of the flow ratio of the two fluids by rotating the handle 49 in the position shown in Fig. 1; that is with the serrations 50 thereon engaging the serrations on the member 41. The flow ratio of the two fluids may also be controlled independently of the total flow thereof by rotation of the handle 49 with the serrations thereon in engagement with the serrations 59 on the controller 34, the total area of communication between the chambers 21 and 22 and the chamber 56 remaining constant regardless of the position of the controller, as has been previously explained.

The handle 49 is provided with suitable gaskets 61 and a packing nut 62 around the shaft thereof in order to seal the valve assembly against fluid leakage while, at the same time, permitting the required longitudinal movement of the handle shaft therethrough. The handle 49 is also provided with a flanged guide portion 63 which is engageable with a central bore 64 in the element 41 to position the handle along the axis of the valve body during movement of the handle into engagement with the ratio controller 34.

Referring now in particular to Fig. 1, it will be observed that the spring loading arrangement of the valves 23 and 24 provides compensation for variations in dimensions of these two valves as well as for any unevenness in wear therebetween. In addition, it will be seen that, by reason of the provision of the plug portions 23a and 24a, the valves 23 and 24 may be retracted from within the valve seats 17 and 18 by a certain amount before the flow of fluids from the inlet passages becomes appreciable.

This permits the sealing members 23b and 24b to be moved an equivalent distance away from the valve seats before the flow of fluid becomes appreciable, thus greatly reducing the erosion wear on these sealing members which would otherwise occur by reason of high velocity fluid flow across the seals at slight or small valve openings. The springs 32 and 33 are therefore pre-compressed in the assembly of the valves 23 and 24 by an amount sufficient to resist the fluid pressure on the valve inlets. The provision of an initial compression in the springs 32 and 33 also serves to maintain a substantially constant flow through various settings of the flow ratio controller 34 since the difference in pressure drops through the valve inlets which occurs by reason of a difference in flows of the two fluids would otherwise tend to deflect one of the valves and thus change the flow through that valve.

Referring now to the arrangement shown in Figs. 5 through 8, it will be observed that the valve shown comprises an outer casing or body 1 which includes cylindrically shaped elements 65 and 66, fastened together by means of a packing nut 67 and a sealing gasket 68, and an end piece 69 threaded into the element 66. The element 65 is provided with a pair of inlet passages 2 and 3 which are connectible to sources of fluids, such as hot and cold water.

Flow of the fluids from the inlet passages into a pair of fluid chambers 71 and 72 is controlled by a pair of valves 73 and 74 comprising valve seals 73a and 74a, cylindrical guides 73b and 74b, and plugs 73c and 74c. The valves 73 and 74 are mounted so as to be longitudinally movable within a pair of bored holes 75 and 76 in a circular plate 77 which may be brazed to the cylindrical element 65 or which may be formed integrally therewith. A pair of suitable valve seats 78 and 79 are mounted in a circular plate 80 and are positioned so as to be engaged by the valves 73 and 74 upon movement of the valves to the closed position.

The valves 73 and 74 are mounted on a rectangular plate 81 by means of a pair of flanged posts 82 and 83 which are secured to the plate 81 as shown and which provide mounting means for a pair of coil springs 84 and 85 to achieve an individual resilient mounting of the valves. The flanged posts are held into engagement with the valves 73 and 74 by means of a pair of washers 86 and 87 which are secured to the guides 73b and 74b.

An operating rod 88 is secured to the plate 81 and extends into a recess 89 in an externally threaded portion of a flow control handle 91. The rod 88 is fastened by means of a snap washer 92 so as to be axially movable with the handle 91 while permitting independent relative rotation thereof.

The externally threaded portion 90 of the handle 91 is positioned so as to engage and interact with an internally threaded frame member 93 which is secured to the casing member 66 as shown in Fig. 6, or which may be formed integrally therewith. It will be seen that, with the arrangement just described, the valves 73 and 74 may be actuated to the open or the closed position by rotation of the flow control handle 91, such rotation causing advancement or retraction of the handle along the axis thereof within the threaded member 93 thereby longitudinally displacing the plate 81 through the agency of the operating rod 88 and thus actuating the valves through the flanged posts 82 and 83 to open or close the inlet passages 2 and 3.

Thus, the valves 73 and 74 may be actuated by rotation of handle 91 to control flow of the fluids from the inlet passages 2 and 3 into the chambers 71 and 72, which chambers are separated from each other by a wall portion 77a extending from the plate 77 and engaging the plate 80. The shape of the wall 77a is shown in dotted lines in Fig. 8.

Means are also provided for controlling the flow ratio of the fluids from the fluid chambers 71 and 72 into a mixing chamber 106, the flow ratio control being operable without influencing the position of the flow control and vice versa. In the embodiment shown in Figs. 5 through 8, the ratio control is operable through the agency of a separate handle 94 as distinguished from the embodiment of Figs. 1 through 4 where both the total flow and the flow ratio are controllable by means of a single operating means movable between two positions.

Referring now in particular to Figs. 5 and 7, a flow ratio controller 95 is positioned in the valve casing with a portion thereof adjacent and in engagement with the valve plate 77, the ratio controller 95 having arcuate closure portions 96 and 97 forming a part thereof, as seen in Fig. 5, which closure portions are shaped so as to be capable of overlapping and closing off a pair of openings in the form of arcuate sectors in the plate 77. Attached to and forming a part of the ratio controller 95 is an actuator portion 100 formed of a pair of arcuately shaped arms 101 and 102, seen in cross section in Fig. 6, extending from a cylindrical portion 103.

A bearing member 104 is threaded within the cylindrical portion 103 of the ratio controller 95 so as to engage the shaft of the flow control handle 91, the bearing member 104 being positioned concentrically with the end piece 69 to cooperate therewith and position the flow control handle for rotative movement within the valve body.

Thus, the ratio controller handle 94 may be rotated to sweep the closure portions 96 and 97 back and forth across the openings 98 and 99 to control relative flow of the fluids from the chambers 71 and 72 into a mixing chamber 106, the positioning and extent of the slots 98 and 99 being such with respect to the positioning and extent of the closure members 96 and 97 that the total flow area through the openings 98 and 99 is substantially constant regardless of the position of the closure members. In the embodiment shown in Figs. 5 through 8, the arcuate slots 98 and 99 each extending over an arc of about 67°, their radial center lines being displaced from each other by about 113°; while the closure members 96 and 97 are positioned diametrically opposite each other, each extending over an arc of about 67°.

The mixed fluid is removed from the mixing chamber 106 by means of one or more ports or openings 107 connectible to a faucet or other suitable fluid discharge means. It will be seen therefore that the flow of fluids from the inlet passages 69 and 70 through the discharge ports 107 may be controlled by rotation of the flow control handle 91, while the ratio of flow of the two fluids may be controlled independently of the total flow thereof by rotation of the ratio control handle 94 to control, for instance, the temperature of the discharged fluid in the event that the fluids to be regulated are of different temperatures.

It will be observed that the spring loading arrangement of the valves 73 and 74 in the embodiment of Figs. 5 through 8 is similar to that illustrated in Fig. 1 and described above, and it will be appreciated that the attendant advantages set forth above are also attained in the arrangement of Figs. 5 through 8. Guide means such as two or more cylindrical pins 105 are mounted on the elongated plate 81 and are positioned so as to be engageable with cooperating holes in the frame member 93 and thus prevent the transmission of torque from the handle 91 when the handle is rotated to open or close the valves 73 and 74.

Referring to Fig. 5, it will be observed that the shaft of the flow control handle 91 and the cylindrical portion of the ratio controller 95 are provided with suitable packing washers 108 and 109 to effect a fluid tight seal around these movable members, and that the assembly and arrangement of parts is such as to permit ease of assembly and disassembly for maintenance and repair purposes. It will also be observed that the various elements are such in function and in physical shape as to permit the application of mass production manufacturing techniques, a substantial portion of the elements being capable of formation by casting or molding techniques with relatively few machining operations being required.

Although I have shown several embodiments of my invention for the purpose of setting forth a full and clear disclosure thereof, it will be understood that my invention is not limited to the specific arrangements shown and described herein, and that various changes, modifications and substitutions falling within the true scope and spirit of my invention as set forth in the appended claims will occur to those skilled in the art.

What I claim as new and desire to secure by Letters Patent of the United States is:

1. A valve for controlling the total flow of a pair of fluids and for regulating the relative flows thereof comprising a pair of inlet ports each connectible to a fluid source, a pair of fluid chambers in said valve each connected to one of said inlet ports, a pair of closure members longitudinally movable to control fluid communication between said inlet ports and said fluid chambers, mounting means for said closure members, separate spring means for each of said closure members positioned so as to permit independent longitudinal deflection of each of said closure members in one direction relative to said mounting means, said spring means being pre-compressed by an amount sufficient to prevent substantial deflection thereof under the influence of the pressures of said fluids at said inlet ports, a mixing chamber for said fluids, an intermediate member separating said fluid chambers from said mixing chamber and having a pair of openings therein each interconnecting one of said fluid chambers with said mixing chamber, a movably mounted flow ratio control member having portions thereon movable therewith and capable of overlapping the openings in said intermediate member to simultaneously control in an inverse manner the fluid flows between said fluid chambers and said mixing chamber, the openings in said intermediate member and said overlapping portions being shaped such that the total area of communication between said fluid chambers and said mixing chamber remains substantially constant with movement of said flow ratio control member, an operating member rotatably mounted to allow longitudinal advancement or retraction with rotation thereof, said operating member being connected to said closure member mounting means, and manually operable means movable to one position to engage portions of said operating member and thereby permit actuation of said closure members to control the total flow of said fluids, said manually operable means being movable to a second position to engage portions of said flow ratio control member and thereby permit manual actuation thereof to independently control the ratio of flows between said fluids.

2. A valve for controlling the total flow of a pair of fluids and for regulating the relative flows thereof comprising an outer cylindrical valve body, a first flat cylindrically shaped plate supported in said valve body near one end thereof, a pair of inlet ports in said first plate each connectible to a fluid source, a second cylindrically shaped plate mounted in said valve body and longitudinally displaced from said first plate, a partition extending between said first and second plates between said inlet ports and forming a pair of fluid chambers between said plates with each of said fluid chambers being in fluid communication with one of said inlet ports, a pair of closure members longitudinally movable to control fluid communication between said inlet ports and said fluid chambers, a mounting member supporting said closure members, a mixing chamber in said valve body adjacent said second plate on the side thereof opposite from said fluid chambers, fluid discharge means comprising at least one outlet port in said mixing chamber, a pair of openings in said second plate each interconnecting one of said fluid chambers and said mixing chamber, a flow ratio control member rotatably mounted in said mixing chamber adjacent said second plate and having a flat surface thereon engaging the surface of said second plate adjacent said mixing chamber, said flow ratio control member having portions thereon movable therewith to overlap the openings in said second plate to simultaneously control in an inverse manner the fluid flows between said fluid chambers and said mixing chamber, said overlapping portions and the openings in said second plate being shaped such that the total area of communication between said fluid chambers and said mixing chamber remains substantially constant with movement of said flow ratio control member, means for rotatably actuating said flow ratio control member to control the ratio of fluid flows, and means for longitudinally actuating said mounting member to move said closure members and thereby independently control the total flow of said fluids.

3. A valve for controlling the total flow of a pair of fluids and for regulating the relative flows thereof comprising an outer cylindrical valve body, a first flat cylindrically shaped plate supported in said valve body near one end thereof, a pair of inlet ports in said first plate each connectible to a fluid source, a second flat cylindrically shaped plate mounted in said valve body and longitudinally displaced from said first plate, a partition extending between said first and second plates between said inlet ports and forming a pair of fluid chambers between said plates with each of said fluid chambers being in fluid communication with one of said inlet ports, a pair of closure members longitudinally movable to control fluid communication between said inlet ports and said fluid chambers, a mounting member supporting said closure members, separate spring mounting means for each of said closure members positioned so as to permit independent longitudinal deflection of each of said closure members in one direction relative to said mounting member, said spring means being compressed in their maximum extended position by an amount sufficient to prevent substantial deflection thereof under the influence of the pressures of said fluids at said inlet ports, a mixing chamber in said valve body adjacent said second plate on the side thereof opposite from said fluid chambers, fluid discharge means comprising at least one outlet port in said mixing chamber, a pair of openings in said second plate each interconnecting one of said fluid chambers and said mixing chamber, a flow ratio control member rotatably mounted in said mixing chamber adjacent said second plate and having a flat surface thereon engaging the surface of said second plate adjacent said mixing chamber, said flow ratio control member having portions thereon movable therewith to overlap the openings in said second plate to simultaneously control in an inverse ratio the fluid flows between said fluid chambers and said mixing chamber, said overlapping portions and the openings in said second plate being shaped such that the total area of communication between said fluid chambers and said mixing chamber remains substantially constant with movement of said flow ratio control member, means for rotatably actuating said flow ratio control member to control the ratio of fluid flows, and means for longitudinally actuating said mounting member to move said closure members and thereby independently control the total flow of said fluids.

4. A valve for controlling the total flow of a pair of fluids and for regulating the relative flows thereof comprising an outer cylindrical valve body, a first flat cylindrically shaped plate supported in said valve body near one end thereof, a pair of inlet ports in said first plate each connectible to a fluid source, a second flat cylindrically shaped plate mounted in said valve body and axially displaced from said first plate, a partition extending between said first and second plates between said inlet ports and forming a pair of fluid chambers between said plates with each of said fluid chambers being in fluid communication with one of said inlet ports, a pair of closure members longitudinally movable to control fluid communication between said inlet ports and said fluid chambers, a mounting member supporting said closure members, a mixing chamber in said valve body adjacent said second plate on the side thereof opposite from said fluid chambers, fluid discharge means comprising at least one outlet port in said mixing chamber, a pair of openings in said second plate each interconnecting one of said fluid chambers and said mixing chamber, a flow ratio control member rotatably mounted in said mixing chamber adjacent said second plate and having a flat surface thereon engaging the surface of said second plate adjacent said mixing chamber, said flow ratio control member having portions thereon movable therewith to overlap the openings in said second plate to simultaneously control in an inverse ratio the fluid flows between said fluid chambers and said mixing chamber, said overlapping portions and the openings in said second plate being shaped such that the total area of communication between said fluid chambers and said mixing chamber remains substantially constant with movement of said flow ratio control member, a first manually actuable member operatively connected to said flow ratio control member to permit manual adjustment of the ratio of said fluid flows, and a second manually actuable member operatively connected to said mounting member to permit longitudinal adjustment of said closure members for controlling the total flow of said fluids, whereby the total flow of said fluids and the ratio of said fluid flows may be independently controlled by said manually actuable members.

References Cited in the file of this patent

UNITED STATES PATENTS

| 1,712,298 | Ford | May 7, 1929 |
| 2,149,367 | Sedlon et al. | Mar. 7, 1939 |
| 2,188,258 | Zinkil et al. | Jan. 23, 1940 |

FOREIGN PATENTS

| 200,603 | Switzerland | Jan. 2, 1939 |